Patented May 20, 1930

1,759,258

UNITED STATES PATENT OFFICE

WINFRID HENTRICH AND MAX HARDTMANN, OF WIESDORF-ON-THE-RHINE, AND ERNST TIETZE, OF COLOGNE-ON-THE-RHINE, GERMANY, ASSIGNORS TO GENERAL ANILINE WORKS, INC., OF NEW YORK, N. Y., A CORPORATION OF DELAWARE

PROCESS FOR PREPARING DYEINGS ON THE FIBER

No Drawing. Application filed December 20, 1928, Serial No. 327,465, and in Germany December 28, 1927.

The present invention concerns the application of diazonium fluoro sulfonates in the manufacture of dyestuffs on the fiber.

In accordance with the invention diazonium fluoro sulfonates containing no sulfonic acid and no carboxylic acid group, which may be represented by the general formula:

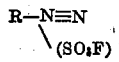

wherein R stands for the residue of any diazo component containing no sulfonic acid and no carboxylic acid group are employed in the manufacture of dyestuffs on the fiber.

The diazonium fluoro sulfonates employed in our invention may be prepared by diazotizing the corresponding amines in a rather concentrated solution, adding to the diazo compound the calculated amount of the ammonium salt of the fluoro sulfonic acid; the new compounds crystallize (compare Berichte 1927, page 968).

The diazonium compounds of the fluoro sulfonates are distinguished from the diazonium compounds of the zinc chloride double salts, the naphthalene-polysulfonates or the borofluorides especially by a low inflammability and explosiveness and moreover possess the advantage of high stability and ready solubility in water.

The manufacture of the dyestuffs on the fiber is effected by impregnating cotton with an aqueous solution of any coupling component containing no sulfonic acid and no carboxylic acid group, squeezing or centrifuging the cotton and developing by introducing same into a diluted aqueous solution of a diazonium fluoro sulfonate of the above identified kind, for instance into a solution containing 0.2 to about 1% of the diazonium compound, squeezing the cotton, washing and drying the same.

The invention is illustrated by the following examples, but is not limited thereto:

*Example 1.*—Cotton yarn is impregnated with a solution of 10 grams of 2.3-hydroxy naphthoic acid anilide per litre, centrifuged and developed by introducing into a solution of 2.4 grams of 4-nitrobenzene diazonium fluoro sulfonate per litre, squeezed, washed and dried. In this manner is obtained a vivid red of excellent fastness properties.

*Example 2.*—On replacing in Example 1 the 2.3-hydroxy naphthoic acid anilide by 2.3-hydroxy naphthoic acid-α-naphthalide and the 4-nitrobenzene diazonium fluoro sulfonate by 3.3'-dimethoxy-diphenyl-4.4'-bisdiazonimum fluoro sulfonate a very clear blue is obtained in an analogous manner.

*Example 3.*—On replacing in Example 2 the 3.3'-dimethoxy diphenyl-4.4'-bisdiazonium fluoro sulfonate by an equivalent quantity of 2.3'-dimethyl azobenzene-4'-diazonium fluoro sulfonate, a bright garnet is obtained possessing excellent fastness properties.

*Example 4.*—A clear violet is obtained by causing 5-benzoylamino-2.4-dimethoxy phenyl-diazonium fluoro sulfonate to act as the dyeing salt on a material impregnated with 2-naphthol-3-carboxylic acid-2'-toluidide.

We claim:

1. The process which comprises introducing cotton which is impregnated with an aqueous solution of any coupling component containing no sulfonic acid and no carboxylic acid group into an aqueous solution of a diazonium fluoro sulfonate, containing no sulfonic acid and no carboxylic acid group, squeezing the cotton, washing and drying the same.

2. The process which comprises introducing cotton which is impregnated with an aqueous solution of a 2.3-hydroxy naphthoic acid arylide into an aqueous solution of a diazonium fluoro sulfonate, containing no sulfonic acid and no carboxylic acid group, squeezing the cotton, washing and drying the same.

3. The process which comprises introducing cotton which is impregnated with an aqueous solution of 2.3-hydroxy naphthoic acid anilide, into an aqueous solution of 4-nitrobenzene diazonium fluoro sulfonate, squeezing the cotton, washing and drying the same.

In testimony whereof we have hereunto set our hands.

WINFRID HENTRICH. [L. S.]
MAX HARDTMANN. [L. S.]
ERNST TIETZE. [L. S.]